Figure 1:
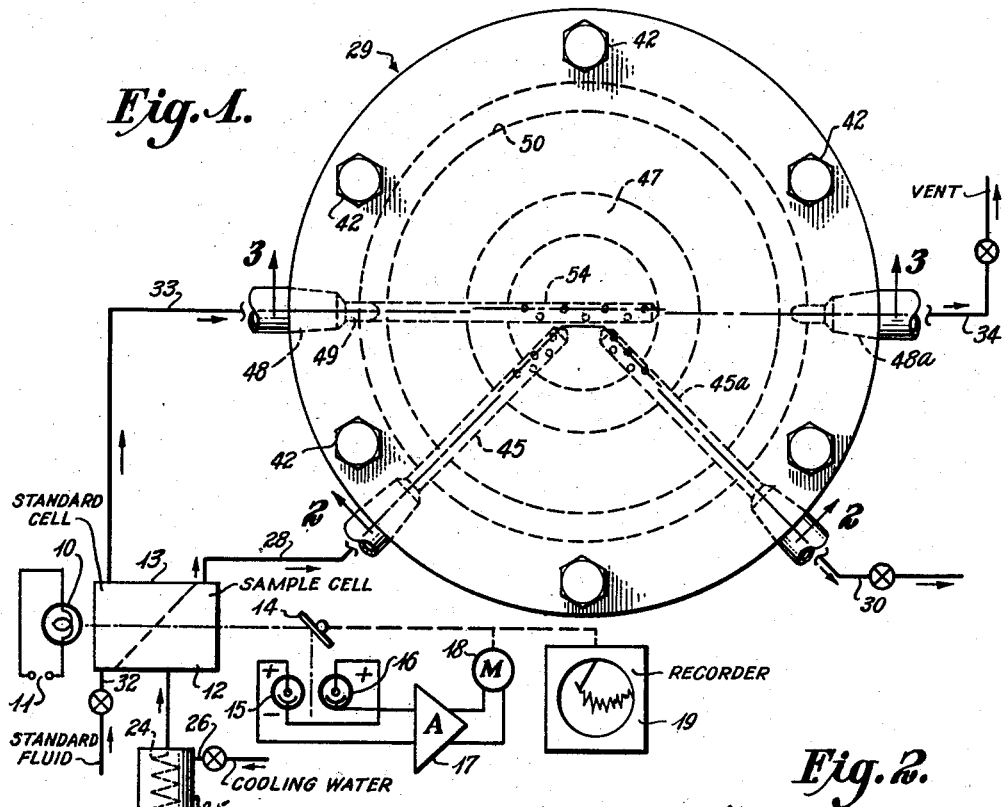

Oct. 6, 1959 M. E. REINECKE ET AL 2,907,339
DIFFERENTIAL REFRACTOMETER
Filed March 27, 1953

INVENTORS
M. E. Reinecke Jr.
B. J. Simmons
BY Hudson & Young
ATTORNEYS

United States Patent Office 2,907,339
Patented Oct. 6, 1959

2,907,339

DIFFERENTIAL REFRACTOMETER

Marvin E. Reinecke and Bill J. Simmons, Bartlesville, Okla., assignors to Phillips Petroleum Company, a corporation of Delaware Application March 27, 1953, Serial No. 345,002

6 Claims. (Cl. 137—87)

This invention relates to differential refractometers. In another aspect, it relates to a pressure equalizing device which is useful alone or in combination with the fluid-containing cells of a differential refractometer.

In differential refractometers, a beam of radiation is passed through a body of standard fluid and a body of sample fluid to be analyzed, the resulting deviation of the radiation beam being indicative of the refractive properties of the sample fluid. It is quite important, in such instruments, that the fluid in the standard cell and sample cell be maintained accurately at the same pressure. Where the instrument is utilized in the analysis of volatile fluids, such as propane, rather high pressures must oftentimes be used in the fluid-containing cells.

It has been proposed to equalize the pressure between the cells by connecting them to opposite sides of a bellows. However, a highly sensitive bellows is required for properly equalizing the pressure, and it is extremely difficult to obtain the requisite sensitivity under the high pressure conditions frequently encountered. Further, flexible materials such as rubber are slightly soluble in certain of the materials, particularly hydrocarbons, which are to be analyzed, and even small amounts of material dissolved in the standard fluid can substantially impair the extremely high accuracy of an instrument, such as a differential refractometer.

In accordance with this invention, a pressure equalizing device is provided which is capable of withstanding high pressures, is extremely sensitive, and in which the materials used in the equalizer diaphragms are prevented from dissolving in the standard fluid. The pressure equalizing device of this invention is particularly adapted for use in a differential refractometer, but has application in other devices where pressures between two fluid-containing vessels must be accurately equalized.

It is an object of the invention to provide a pressure equalizing device of novel construction.

It is a further object to provide a standard and sample cell apparatus for a differential refractometer embodying such pressure equalizing device.

It is a still further object to provide such a device wherein the pressures are equalized with great accuracy, and the fluids are protected from contamination by materials dissolved from the pressure equalizing medium.

It is a further object to provide a pressure equalizing device of rugged construction, which is capable of withstanding high pressures and yet can be built at a low cost from standard materials.

Figure 2:
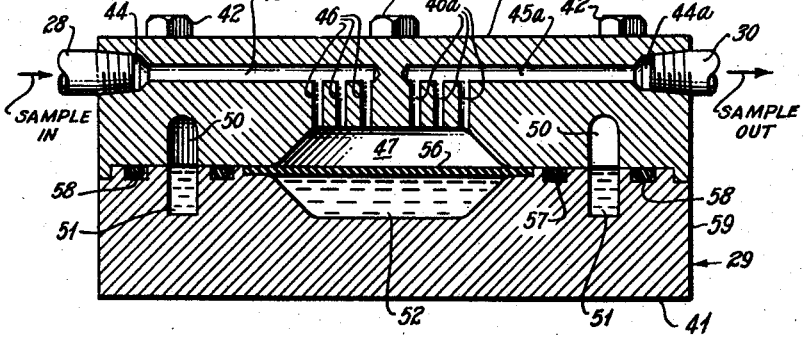
Figure 3:
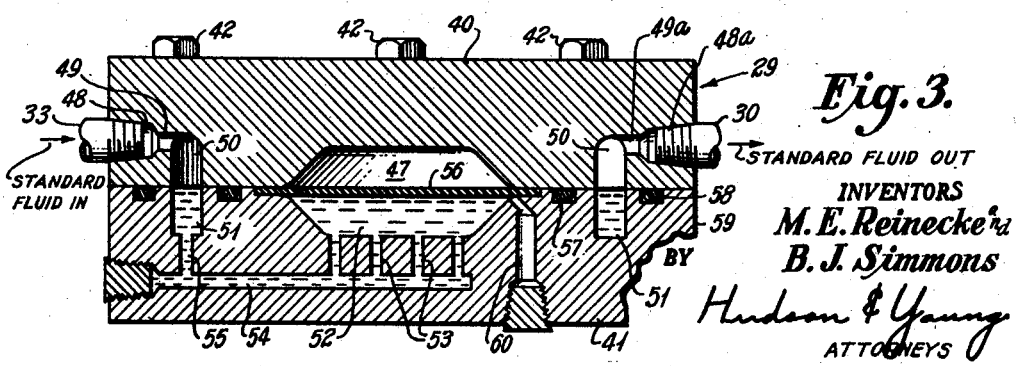

Various other objects, advantages and features of the invention will become apparent from the following detailed description taken in conjunction with the accompanying drawings, in which:

Figure 1 is a schematic view of a differential refractometer utilizing the pressure equalizing device of this invention; and Figures 2 and 3 are, respectively, sectional views taken along the lines 2—2 and 3—3 of Figure 1 looking in the direction of the arrows.

Referring now to the drawings in detail, the refractometer includes a radiation source 10, which may be an incandescent lamp, connected in circuit with a suitable current source 11. Radiation from source 10 passes through a sample cell 12 and a standard cell 13 wherein the radiation beam is deflected by an amount proportional to the difference in refractive indices between the fluids in the standard cell and sample cell. The deflected beam passing from the cell impinges upon a movable mirror 14 and is reflected therefrom onto a pair of photoelectric cells 15 and 16 which are connected in series-opposing relationship. The electrical output of the cells 15 and 16 is fed to the input circuit of an amplifier 17, the output of which is transmitted to a servo-motor 18 mechanically connected to movable mirror 14 and to a recorder 19.

The servo-motor 18 is so connected that mirror 14 is automatically moved to a position where the radiation beam is centered between the two photoelectric cells. The extent of rotation of the mirror necessary to accomplish this is proportional to the difference in refractive indices of the standard and sample fluids, which difference is transmitted by motor 18 to the recorder 19 where it is suitably indicated, recorded or both. Details of construction of a suitable differential refractometer of the type described are set forth in the copending application of Elmer Miller et al., Serial No. 264,458, now Patent Number 2,857,799 entitled "Differential Refractometer."

In accordance with the invention, sample fluid is admitted through a valved line 23 whence it passes through a cooling coil 24 immersed within a body of water in a vessel 25, cooling water being supplied to the vessel through a valved line 26 and being withdrawn therefrom through a valved line 27. From the coil 24, the cooled fluid enters the sample cell 12 and, thence, passes through a line 28 to one chamber of the pressure equalizing device of this invention which is generally indicated by reference numeral 29. After passing through the pressure equalizer vessel, which will be described in detail hereinafter, the sample fluid passes through a valved line 30 to a vent or other disposal as desired.

Standard fluid can be introduced into standard cell 13 through a valved line 32, the standard cell communicating by a line 33 with a second pressure chamber in equalizing device 29, this second pressure chamber also communicating with a valved outlet line 34. It will be understood that the standard fluid is normally entrapped within the system by closing the valves in lines 32, 34 so as to fill standard cell 13, lines 33, 34 and the chamber of the pressure equalizing device. Of course, if desired, standard fluid could be continuously circulated through the system.

The detailed construction of the equalizing device 29 is shown in Figures 2 and 3. This unit is formed from two heavy metal disks or blocks 40 and 41 rigidly secured together by bolts 42, Figure 1. Sample fluid inlet line 28 communicates with an enlarged radial port 44 which, in turn, is connected through a radial bore 45 of reduced diameter and a plurality of small passages 46 with a central interior chamber 47 formed in the disk 40. In similar fashion, sample fluid outlet line 30 is connected to chamber 47 by an enlarged port 44a, a reduced bore 45a and small passages 46a.

Standard fluid inlet line 33 communicates through an enlarged port 48 and a bore 49 of reduced diameter with an annular groove 50 formed in the disk 40, and standard fluid outlet line 34 communicates with the groove 50 through a similar port 48a and bore 49a. Annular groove 50 cooperates with a corresponding annular groove 51 formed in disk 41 to define an enlarged annular chamber. A central chamber 52 complementary with the chamber 47 is also formed in the disk 41. Chamber 52 communicates with annular groove 51 through several small passageways 53, a common plugged radial bore 54, and a bore 55.

A flexible diaphragm 56 separates chambers 47 and 52, this diaphragm being fitted between the adjacent surfaces of disks 40, 41 around the edges of the enlarged volume defined by the chambers 47 and 52. In order to obtain high sensitivity, diaphragm 56 should be formed from a flexible or rubbery material, preferably neoprene. In order to seal the chambers of the pressure equalizing device, an annular gasket or O ring 57 is provided at the junction between disks 40, 41 and located between chambers 47, 52 on the one hand and chambers 50, 51 on the other hand. An annular gasket or O ring 58 is disposed at the region of engagement of the disks 40, 41 between the chambers 50, 51 and the periphery 59 of the equalizing device. A plugged passage 60 communicates with the chamber 52 adjacent diaphragm 56 to permit air to be bled from the chamber in the manner hereinafter described.

In accordance with the invention, chamber 52 is filled with a protective liquid, which also occupies, at least in part, the region defined by passageways 53, bore 54, bore 55 and lower annular groove 51, this liquid being introduced through line 33 with the plug removed from passage 60 so that any air within the chamber 52 is displaced by the protective liquid as it is introduced into the device, it being understood that the passage 60 is blocked off after the protective liquid has been introduced.

Preferably and advantageously, the protective liquid is mercury, although other protective liquids, such as water or oil, can be used in some applications of the device. The mercury or other protective liquid prevents the rubbery material of the diaphragm from being dissolved in the standard fluid occupying chamber 50, which can be a hydrocarbon, such as propane, for example. As previously stated, the standard fluid is normally trapped within the instrument by closure of the valves in standard fluid lines 32 and 34. During continued operation of the instrument, sufficient material would be dissolved from the diaphragm by the entrapped standard fluid to cause serious inaccuracies in the reading of the instrument where the protective liquid is not present to prevent such dissolving of the diaphragm material. It is ordinarily not necessary to provide a protective liquid in chamber 47, as the sample fluid continuously circulates through the instrument, and small amounts of impurities dissolved in this fluid would pass out through line 30 and not be present in the sample chamber 12.

It will be evident that the diaphragm 56 can move upwardly or downwardly in the chambers 47, 52 to compensate for pressure differences which might exist between chamber 47 which communicates with sample cell 12 and annular groove 50 which communicates with standard cell 13. In this manner, fluids in the standard and sample cells are maintained very accurately at the same pressure during the operation of the instrument. It will be evident, from the foregoing discussion, that the pressure equalizing device of this invention has many applications, although it is particularly adapted for use in connection with a differential refractometer, as described.

Due to the massive construction of the disks 40, 41 and the efficient sealing provided by the gaskets 57, 58 the equalizing device is capable of operating under conditions of very high pressure without leakage and with an effective pressure equalizing action. It is a feature of the invention that no injury to the diaphragm will occur should an excessive pressure differential develop between the two sides of the diaphragm. For example, when the refractometer is utilized in connection with a high pressure sample, the standard fluid must also be under high pressure, and the sample cell is normally disconnected when the standard fluid is introduced. Under such circumstances, an extremely high pressure exists within the standard cell 13 and annular groove 30, compared to the pressure in the sample cell 12 and chamber 47, which may be at atmospheric pressure. In such case, the resilient diaphragm is merely forced upwardly against the upper surface of chamber 47 and no damage to the equalizer results, whereas a metal diaphragm might be ruptured under such circumstances unless it were made so heavy that the requisite sensitivity could not be obtained.

It will be evident that we have achieved the objects of our invention in providing a simple, rugged and compact pressure equalizing device particularly adapted for use with a differential refractometer. The pressure equalizing action is quite sensitive, the device is not damaged by a high differential pressure across the diaphragm, and the material making up the standard fluid is protected from contamination by dissolving of the diaphragm material therein.

While the invention has been described in connection with a present, preferred embodiment thereof, it is to be understood that this description is illustrative only and is not intended to limit the invention.

We claim:

1. A fluid pressure equalizing device comprising, in combination, a pair of metal blocks, means rigidly securing said blocks together, complementary central chambers formed in the respective blocks, complementary annular grooves formed in the respective blocks encircling said chambers, an annular gasket disposed between said chambers and said grooves at the engaging surfaces of said blocks, an annular gasket disposed between the periphery of said blocks and said annular grooves at the engaging surfaces of said blocks, a diaphragm mounted between said chambers and secured between adjoining surfaces of said blocks around the periphery of said chambers, a pair of bores extending radially inward from the edge of one block and communicating with the chamber therein, a passageway in the other block connecting the chamber therein with said annular groove, a pair of radial ports communicating with the annular groove in said one block, a protective liquid filling the chamber adjoining said passageway, and a bleed port communicating with said last-mentioned chamber at a region adjacent said diaphragm.

2. A pressure equalizing device in accordance with claim 1 in which the protective liquid is mercury.

3. A fluid pressure equalizing device comprising, in combination, a pair of metal disks, means rigidly connecting said disks together, complementary central chambers in said disks, a diaphragm separating said chambers and secured between said disks at the edges of said chambers, complementary annular grooves formed in said disks encircling said central chambers, means for sealing said chambers and the region defined by said annular grooves, port means communicating with one of said chambers, pressure of a fluid passing through said port means being transmitted to one side of said diaphragm, a passageway connecting the other of said chambers with one of said annular grooves, the other chamber and at least a portion of said passageway being adapted to be filled with a protective liquid contacting the other side of said diaphragm, and port means communicating with the region defined by said annular grooves, pressure of a fluid passing through the last-mentioned port means being transmitted through said protective liquid to said other side of the diaphragm.

4. A fluid pressure equalizing device comprising, in combination, a pair of metal disks, means rigidly securing said disks together, complementary central chambers formed in the respective disks, complementary annular grooves formed in the respective disks encircling said chambers, an annular gasket disposed between said chamber and said grooves at the engaging surfaces of said disks, an annular gasket disposed between the periphery of said disks and said annular grooves at the engaging surfaces of said disks, a diaphragm mounted between said chambers and secured between adjoining surfaces of said disks around the periphery of said chambers, a pair of bores extending radially inward from the edge of one disk and communicating with the chamber therein, the pressure of a fluid passing through said bores being transmitted to one side of said diaphragm, a passageway in the other disk connecting the chamber therein with said annular groove, and a pair of radial bores communicating with the annular groove in said one disk, said passageway, the adjoining chamber, and at least a portion of the adjoining annular groove being adapted to receive a protective liquid transmitting the pressure of a fluid passing through the last-mentioned bores to the other side of said diaphragm.

5. The fluid pressure equalizing device of claim 4 wherein a bleed port communicates with the chamber adapted to contain said protective liquid at a region adjacent said diaphragm.

6. A fluid pressure equalizing device comprising, in combination, a pair of metal pieces having complementary central chambers therein, means rigidly connecting said metal pieces together, a diaphragm separating said chambers and secured between said metal pieces at the edges of said chambers, said metal pieces being shaped to define an opening extending around said central chambers, means for sealing said chambers and the region defined by said opening, port means communicating with one of said chambers, pressure of a fluid passing through said port means being transmitted to one side of said diaphragm, a passageway connecting the other of said chambers with said opening, the other chamber and at least a portion of said passageway being adapted to be filled with a protective liquid contacting the other side of said diaphragm, and port means communicating with the region defined by said opening, pressure of a fluid passing through the last-mentioned port means being transmitted through said protective liquid to said other side of the diaphragm.

References Cited in the file of this patent

UNITED STATES PATENTS

| | | |
|---|---|---|
| 830,225 | Haber | Sept. 4, 1906 |
| 2,000,542 | Wasson | May 7, 1935 |
| 2,007,677 | Farmer | July 9, 1935 |
| 2,427,996 | Seaman | Sept. 23, 1947 |
| 2,624,014 | Barstow | Dec. 30, 1952 |
| 2,664,749 | Jones | Jan. 5, 1954 |
| 2,724,304 | Crawford | Nov. 22, 1955 |
| 2,736,332 | Simmons | Feb. 28, 1956 |